United States Patent
Dobyns et al.

(10) Patent No.: US 10,084,512 B2
(45) Date of Patent: *Sep. 25, 2018

(54) PROXIMITY BOUNDARY BASED COMMUNICATION

(71) Applicant: FREELINC TECHNOLOGIES, Orem, UT (US)

(72) Inventors: Douglas Howard Dobyns, Lindon, UT (US); Michael Scott Abrams, Sherborn, MA (US)

(73) Assignee: FREELINC TECHNOLOGIES, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,176

(22) Filed: Dec. 4, 2017

(65) Prior Publication Data

US 2018/0097545 A1 Apr. 5, 2018

Related U.S. Application Data

(63) Continuation of application No. 14/841,404, filed on Aug. 31, 2015, now Pat. No. 9,838,082.
(Continued)

(51) Int. Cl.
*H04B 5/00* (2006.01)
*G06Q 20/40* (2012.01)
(Continued)

(52) U.S. Cl.
CPC ........... *H04B 5/0031* (2013.01); *G06Q 20/40* (2013.01); *H04B 5/0075* (2013.01);
(Continued)

(58) Field of Classification Search
None
See application file for complete search history.

(56) References Cited

U.S. PATENT DOCUMENTS 3,660,760 A 5/1972 Schaad et al.
4,363,137 A 12/1982 Salisbury
(Continued)

FOREIGN PATENT DOCUMENTS

GB 244965 A 8/2006
WO WO 2007/039835 A2 4/2007
WO WO 2008/048376 A1 4/2008

OTHER PUBLICATIONS

US 8,200,153, 07/2012, Takayama et al. (withdrawn)
(Continued)

*Primary Examiner* — Tuan A Tran
(74) *Attorney, Agent, or Firm* — Thorpe North & Western

(57) ABSTRACT

Technology is described for proximity based communications. A proximity boundary can be defined with dimensions defined, in part, by a communication range of one of a first Short Range Communication (SRC) device and a second SRC device. The first SRC device and the second SRC device can be configured to communicate using near field magnetic induction (NFMI). A proximity signal can be communicated in the proximity boundary between the first SRC device and the second SRC device, wherein at least one of the first and second SRC devices includes at least two antennas to provide magnetic induction diversity. A security permission can be provided to enable selected data to be communicated from one or more of the first SRC device and the second SRC device using NFMI when the proximity signal is detected between the first SRC device and the second SRC device.

24 Claims, 7 Drawing Sheets

Related U.S. Application Data

(60) Provisional application No. 62/044,125, filed on Aug. 29, 2014.

(51) Int. Cl.
  *H04L 29/06* (2006.01)
  *H04W 4/021* (2018.01)
  *H04W 4/06* (2009.01)
  *H04W 12/08* (2009.01)
  *H04W 76/02* (2009.01)
  *H04W 4/00* (2018.01)
  *H04W 76/16* (2018.01)
  *H04W 4/80* (2018.01)
  *H04W 84/12* (2009.01)
  *H04W 84/18* (2009.01)
  *H04W 76/14* (2018.01)

(52) U.S. Cl.
  CPC .......... *H04L 63/0428* (2013.01); *H04L 63/08* (2013.01); *H04L 63/107* (2013.01); *H04W 4/008* (2013.01); *H04W 4/021* (2013.01); *H04W 4/06* (2013.01); *H04W 4/80* (2018.02); *H04W 12/08* (2013.01); *H04W 76/026* (2013.01); *H04W 76/16* (2018.02); *H04W 76/023* (2013.01); *H04W 76/14* (2018.02); *H04W 84/12* (2013.01); *H04W 84/18* (2013.01)

(56) References Cited

U.S. PATENT DOCUMENTS

| | | |
|---|---|---|
| 4,908,869 A | 3/1990 | Lederman |
| 5,187,720 A | 2/1993 | Shibata et al. |
| 5,771,438 A | 6/1998 | Palermo et al. |
| 5,841,122 A | 11/1998 | Kirchhoff |
| 5,912,925 A | 6/1999 | Palermo et al. |
| 5,966,641 A | 10/1999 | Flowerdew |
| 5,982,764 A | 11/1999 | Palermo et al. |
| 6,061,030 A | 5/2000 | Flowerdew |
| 6,134,420 A | 10/2000 | Flowerdew et al. |
| 6,208,740 B1 | 3/2001 | Greyer |
| 6,230,029 B1 | 5/2001 | Hahn et al. |
| 6,347,095 B1 | 2/2002 | Tang et al. |
| 6,384,587 B2 | 5/2002 | Aizawa et al. |
| 6,459,882 B1 | 10/2002 | Palermo et al. |
| 6,636,728 B1 | 10/2003 | Avenel |
| 6,665,804 B1 | 12/2003 | Minowa |
| 6,700,544 B2 | 3/2004 | Anderson |
| 6,792,246 B2 | 9/2004 | Takeda et al. |
| 6,819,762 B2 | 11/2004 | Jones et al. |
| 6,840,448 B2 | 1/2005 | Fukushima et al. |
| 6,869,019 B1 | 3/2005 | Nagi et al. |
| 7,035,608 B2 | 4/2006 | Palermo et al. |
| 7,096,069 B2 | 8/2006 | Wanderstok et al. |
| 7,142,811 B2 | 11/2006 | Terranova et al. |
| 7,149,522 B2 | 12/2006 | Koskelainen |
| 7,182,266 B2 | 2/2007 | Yoshinaga et al. |
| 7,198,198 B2 | 4/2007 | Akiho et al. |
| 7,215,924 B2 | 5/2007 | Palermo et al. |
| 7,236,741 B2 | 6/2007 | Palermo et al. |
| 7,254,366 B2 | 8/2007 | Palermo et al. |
| 7,262,737 B2 | 8/2007 | Zarnowitz et al. |
| RE39,982 E | 1/2008 | Palermo et al. |
| RE40,018 E | 1/2008 | Palermo et al. |
| 7,315,290 B2 | 1/2008 | Harada et al. |
| 7,342,548 B2 | 3/2008 | Taniguchi et al. |
| 7,346,061 B2 | 3/2008 | Takayama et al. |
| 7,364,144 B2 | 4/2008 | Nordmeyer |
| 7,438,235 B2 | 10/2008 | Miura et al. |
| 7,457,637 B2 | 11/2008 | Deguchi et al. |
| 7,532,901 B1 | 5/2009 | LaFranchise et al. |
| 7,541,930 B2 | 6/2009 | Saarisalo et al. |
| 7,565,187 B1 | 7/2009 | Dynok et al. |
| 7,574,173 B2 | 8/2009 | Terranova et al. |
| 7,627,289 B2 | 12/2009 | Huddart |
| 7,647,024 B2 | 1/2010 | Wang et al. |
| 7,712,663 B2 | 5/2010 | Sukegawa et al. |
| 7,818,036 B2 | 10/2010 | Lair et al. |
| 7,818,037 B2 | 10/2010 | Lair et al. |
| 7,831,205 B2 | 11/2010 | Jack et al. |
| 7,872,995 B2 | 1/2011 | Fujii et al. |
| 7,876,737 B2 | 1/2011 | Malik |
| 7,893,888 B2 | 2/2011 | Rofougaran |
| 7,903,041 B2 | 3/2011 | LeVan |
| 7,933,554 B2 | 4/2011 | Hoyt et al. |
| 7,941,096 B2 | 5/2011 | Perkins et al. |
| 8,106,848 B2 | 1/2012 | Rofougaran |
| 8,144,792 B2 * | 3/2012 | Ware .................. G11C 7/1057 375/257 |
| 8,145,744 B2 | 3/2012 | Gieslis |
| 8,190,086 B2 | 5/2012 | Sasaki et al. |
| 8,194,557 B2 | 6/2012 | Sasai et al. |
| 8,224,243 B2 | 7/2012 | Takayama et al. |
| 8,233,841 B2 | 8/2012 | Griffin et al. |
| 8,237,569 B2 | 8/2012 | Arai et al. |
| 8,239,276 B2 | 8/2012 | Lin et al. |
| 8,275,318 B2 | 9/2012 | Hoyt et al. |
| 8,322,615 B2 | 12/2012 | Ikeda |
| 8,335,470 B2 | 12/2012 | Koyama |
| 8,340,577 B2 | 12/2012 | Griffin et al. |
| 8,358,596 B2 | 1/2013 | Byrne et al. |
| 8,380,124 B2 | 2/2013 | Takei et al. |
| 8,385,823 B2 | 2/2013 | Naniyat |
| 8,401,596 B2 | 3/2013 | Takayama |
| 8,410,775 B2 | 4/2013 | LaFranchise et al. |
| 8,416,078 B2 | 4/2013 | Sayegh et al. |
| 8,417,184 B2 | 4/2013 | Takayama et al. |
| 8,422,947 B2 | 4/2013 | Konya |
| 8,427,100 B2 | 4/2013 | Vorenkamp et al. |
| 8,427,330 B2 | 4/2013 | Vorenkamp et al. |
| 8,437,694 B2 * | 5/2013 | Granqvist ............ A61B 5/0002 455/41.1 |
| 8,452,233 B2 | 5/2013 | Noel |
| 8,457,547 B2 | 6/2013 | Meskens |
| 8,457,550 B2 | 6/2013 | Goto et al. |
| 8,466,740 B2 | 6/2013 | Kamata |
| 8,494,198 B2 | 7/2013 | Aldaz et al. |
| 8,532,568 B2 | 9/2013 | Kerselaers |
| 8,532,570 B2 | 9/2013 | Fukami et al. |
| 8,536,736 B2 | 9/2013 | Abramo et al. |
| 8,583,040 B2 | 11/2013 | Baumert et al. |
| 8,588,683 B2 | 11/2013 | Kamata |
| 8,630,584 B2 | 1/2014 | Yu et al. |
| 8,643,219 B2 | 2/2014 | Yabe et al. |
| 8,660,604 B2 * | 2/2014 | Rofougaran ......... H04B 5/0006 455/183.1 |
| 8,665,840 B2 | 3/2014 | Hohl et al. |
| 8,706,029 B2 | 4/2014 | Washiro |
| 8,732,319 B2 * | 5/2014 | Tian ...................... H04B 8/005 709/204 |
| 8,838,022 B2 | 9/2014 | Dobyns |
| 8,880,100 B2 * | 11/2014 | Dobyns ................. H04W 4/008 455/41.2 |
| 8,902,772 B2 | 12/2014 | Lenaerts |
| 8,903,416 B1 | 12/2014 | Perkins et al. |
| 8,909,141 B2 | 12/2014 | Hansen et al. |
| 8,914,863 B2 * | 12/2014 | Prchal .................. H04W 4/026 705/42 |
| 8,929,809 B2 * | 1/2015 | Dobyns ................. H04B 5/0081 235/451 |
| 8,942,629 B2 | 1/2015 | Takayama et al. |
| 8,948,694 B2 | 2/2015 | Ebeid et al. |
| 8,954,005 B2 | 2/2015 | Zhao et al. |
| 8,977,200 B2 | 3/2015 | Kitagawa et al. |
| 8,983,529 B2 | 3/2015 | Akiyama et al. |
| 8,983,615 B2 | 3/2015 | Tahmasian et al. |
| 8,989,657 B2 | 3/2015 | McManus et al. |
| 8,989,659 B2 | 3/2015 | Akita et al. |
| 9,013,303 B2 | 4/2015 | Arai et al. |
| 9,038,894 B2 * | 5/2015 | Khalid ................ G06Q 20/227 235/380 |

(56) References Cited

U.S. PATENT DOCUMENTS

| | | |
|---|---|---|
| 9,048,884 B2 | 6/2015 | LeVan |
| 9,054,746 B2 | 6/2015 | Miyabayashi et al. |
| 9,058,531 B2 | 6/2015 | Slutsky |
| 9,071,288 B2 | 6/2015 | Yamaguchi |
| 9,077,390 B1 | 7/2015 | Joehren |
| 9,082,117 B2 | 7/2015 | Chin |
| 9,106,273 B2 | 8/2015 | Takayama et al. |
| 9,124,306 B2 | 9/2015 | Boyle et al. |
| 9,124,992 B2 | 9/2015 | Jang |
| 9,166,286 B2 | 10/2015 | Matsuoka et al. |
| 9,166,655 B2 | 10/2015 | Meskens et al. |
| 9,197,986 B1 | 11/2015 | Kerselaers et al. |
| 9,208,942 B2 | 12/2015 | Singh et al. |
| 9,219,529 B2 | 12/2015 | Akiyama et al. |
| 9,229,666 B2 | 1/2016 | Oguma et al. |
| 9,231,799 B2 | 1/2016 | Roper et al. |
| 9,235,729 B2* | 1/2016 | Robison .............. G06F 21/6263 |
| 9,264,421 B2* | 2/2016 | Dermu .................. G06F 21/445 |
| 9,281,872 B2* | 3/2016 | Gree .................... H04B 5/0031 |
| 9,294,922 B2 | 3/2016 | Garcia |
| 9,400,985 B2 | 7/2016 | Dobyns |
| 9,513,756 B1 | 12/2016 | Mishra et al. |
| 9,621,227 B2 | 4/2017 | Dobyns et al. |
| 9,621,228 B2 | 4/2017 | Dobyns et al. |
| 9,705,564 B2 | 7/2017 | Dobyns et al. |
| 9,780,837 B2 | 10/2017 | Dobyns et al. |
| 9,819,075 B2 | 11/2017 | Kerselaers et al. |
| 9,838,082 B2 | 12/2017 | Dobyns et al. |
| 2001/0006536 A1 | 7/2001 | Tajima |
| 2002/0132585 A1 | 9/2002 | Palermo et al. |
| 2002/0160722 A1 | 10/2002 | Terranova et al. |
| 2002/0174025 A1 | 11/2002 | Hind et al. |
| 2003/0017826 A1 | 1/2003 | Fishman et al. |
| 2003/0050011 A1 | 3/2003 | Palermo et al. |
| 2003/0161410 A1 | 8/2003 | Smith et al. |
| 2005/0064915 A1 | 3/2005 | Lair |
| 2005/0138077 A1 | 6/2005 | Michael et al. |
| 2005/0164636 A1 | 7/2005 | Palermo et al. |
| 2006/0073825 A1 | 4/2006 | Palermo et al. |
| 2006/0100926 A1 | 5/2006 | Abedi et al. |
| 2006/0119534 A1 | 6/2006 | Semba et al. |
| 2006/0224048 A1 | 10/2006 | Devaul et al. |
| 2007/0054616 A1 | 3/2007 | Culbert |
| 2007/0278290 A1 | 12/2007 | Messerges et al. |
| 2007/0297378 A1 | 12/2007 | Poyhonen et al. |
| 2008/0090520 A1 | 4/2008 | Camp et al. |
| 2008/0091541 A1 | 4/2008 | Law et al. |
| 2008/0278289 A1 | 11/2008 | Gantner |
| 2009/0001930 A1 | 1/2009 | Pohjonen |
| 2009/0027166 A1 | 1/2009 | Stevens et al. |
| 2009/0029743 A9 | 1/2009 | Lair et al. |
| 2009/0038013 A1 | 2/2009 | Zechlin et al. |
| 2009/0041241 A1 | 2/2009 | Dobyns et al. |
| 2009/0081943 A1 | 3/2009 | Dobyns et al. |
| 2009/0146796 A1 | 6/2009 | Goto et al. |
| 2009/0167699 A1 | 7/2009 | Rosenblatt et al. |
| 2009/0189816 A1 | 7/2009 | Nikitin et al. |
| 2009/0212941 A1 | 8/2009 | Vock et al. |
| 2009/0276439 A1 | 11/2009 | Rosesnblatt et al. |
| 2009/0276547 A1 | 11/2009 | Rosenblatt et al. |
| 2010/0026589 A1 | 2/2010 | Dou et al. |
| 2010/0080165 A1 | 4/2010 | Hossain et al. |
| 2010/0104031 A1 | 4/2010 | Lacour |
| 2011/0018768 A1 | 1/2011 | Thoen |
| 2011/0183617 A1 | 7/2011 | Behzad et al. |
| 2011/0201270 A1 | 8/2011 | Perkins et al. |
| 2011/0220527 A1 | 9/2011 | Baatz |
| 2011/0307380 A1 | 12/2011 | Ido |
| 2012/0083228 A1 | 4/2012 | Baumert et al. |
| 2012/0116861 A1 | 5/2012 | Dobyns |
| 2012/0173351 A1 | 7/2012 | Hanson et al. |
| 2012/0202185 A1 | 8/2012 | Jabara et al. |
| 2012/0203620 A1 | 8/2012 | Dobyns |
| 2012/0220227 A1 | 8/2012 | Dobyns |
| 2012/0238209 A1 | 9/2012 | Walker et al. |
| 2012/0281843 A1 | 11/2012 | Christensen et al. |
| 2012/0289153 A1 | 11/2012 | Dobyns |
| 2012/0296770 A1 | 11/2012 | Lin et al. |
| 2012/0317194 A1* | 12/2012 | Tian ..................... H04W 8/005 709/204 |
| 2013/0020394 A1 | 1/2013 | Koujima et al. |
| 2013/0072115 A1 | 3/2013 | Dobyns |
| 2013/0079037 A1 | 3/2013 | Dobyns |
| 2013/0114306 A1 | 5/2013 | Kooken et al. |
| 2013/0217334 A1 | 8/2013 | Yu et al. |
| 2013/0237190 A1* | 9/2013 | Smith ................. H04L 63/0492 455/411 |
| 2013/0269945 A1 | 10/2013 | Mulholland et al. |
| 2013/0314334 A1 | 11/2013 | Leica et al. |
| 2013/0342326 A1 | 12/2013 | Wang et al. |
| 2013/0343585 A1 | 12/2013 | Bennett et al. |
| 2014/0015649 A1 | 1/2014 | Akiyama et al. |
| 2014/0025517 A1* | 1/2014 | Argue ................ G06Q 20/3278 705/21 |
| 2014/0073237 A1 | 3/2014 | Meskens |
| 2014/0073300 A1 | 3/2014 | Leeder et al. |
| 2014/0077937 A1 | 3/2014 | Kato et al. |
| 2014/0091758 A1 | 4/2014 | Hidaka et al. |
| 2014/0096215 A1 | 4/2014 | Hessler |
| 2014/0133584 A1* | 5/2014 | Su ........................ H04B 5/0031 375/256 |
| 2014/0138435 A1 | 5/2014 | Khalid |
| 2014/0141750 A1 | 5/2014 | Lazaridis et al. |
| 2014/0153768 A1 | 6/2014 | Hagen et al. |
| 2014/0154980 A1 | 6/2014 | Jang et al. |
| 2014/0162550 A1 | 6/2014 | Boyle et al. |
| 2014/0173690 A1 | 6/2014 | Ekberg et al. |
| 2014/0181955 A1 | 6/2014 | Rosati |
| 2014/0191968 A1 | 7/2014 | Hohl et al. |
| 2014/0213184 A1 | 7/2014 | Matsubara |
| 2014/0220885 A1* | 8/2014 | Chou .................... H04W 4/008 455/41.1 |
| 2014/0227974 A1 | 8/2014 | Perkins et al. |
| 2014/0256251 A1 | 9/2014 | Caceres et al. |
| 2014/0263619 A1 | 9/2014 | Turocy et al. |
| 2014/0308896 A1 | 10/2014 | Baret et al. |
| 2014/0315485 A1 | 10/2014 | Marie |
| 2014/0348365 A1 | 11/2014 | Edwards |
| 2014/0376051 A1 | 12/2014 | Oguma et al. |
| 2015/0003551 A1 | 1/2015 | Kim |
| 2015/0044968 A1 | 2/2015 | Dobyns |
| 2015/0045069 A1 | 2/2015 | Dobyns |
| 2015/0050883 A1 | 2/2015 | Dobyns |
| 2015/0054455 A1 | 2/2015 | Kim et al. |
| 2015/0058191 A1 | 2/2015 | Khan et al. |
| 2015/0078456 A1 | 3/2015 | Hannuksela |
| 2015/0079902 A1 | 3/2015 | Dhayni |
| 2015/0093988 A1 | 4/2015 | Konanur et al. |
| 2015/0116090 A1 | 4/2015 | Proehl |
| 2015/0127737 A1 | 5/2015 | Thompson et al. |
| 2015/0134510 A1 | 5/2015 | O'Donoghue |
| 2015/0134610 A1 | 5/2015 | Barton |
| 2015/0140927 A1 | 5/2015 | Chen et al. |
| 2015/0171519 A1 | 6/2015 | Han et al. |
| 2015/0180270 A1 | 6/2015 | Takano |
| 2015/0180542 A1 | 6/2015 | Jang et al. |
| 2015/0195100 A1 | 7/2015 | Imes et al. |
| 2015/0229361 A1 | 8/2015 | Liu et al. |
| 2015/0244422 A1 | 8/2015 | Ohashi et al. |
| 2015/0254481 A1 | 9/2015 | Masuda et al. |
| 2015/0256230 A1 | 9/2015 | Yamaguchi |
| 2015/0256231 A1 | 9/2015 | Akiyama et al. |
| 2015/0312744 A1 | 10/2015 | Leppanen et al. |
| 2015/0318896 A1 | 11/2015 | Kerselaers et al. |
| 2015/0318932 A1 | 11/2015 | Kerselaers et al. |
| 2015/0319566 A1 | 11/2015 | Takayama et al. |
| 2015/0327003 A1 | 11/2015 | Dobyns |
| 2015/0365779 A1 | 12/2015 | Kerselaers et al. |
| 2015/0371226 A1 | 12/2015 | Hurley et al. |
| 2015/0381238 A1 | 12/2015 | Wolf et al. |
| 2015/0382150 A1 | 12/2015 | Ansermet et al. |
| 2015/0382196 A1 | 12/2015 | Hillier et al. |
| 2016/0005248 A1 | 1/2016 | Aase |
| 2016/0014582 A1 | 1/2016 | Dobyns |

(56) References Cited

U.S. PATENT DOCUMENTS

2016/0029955 A1 2/2016 Sato
2016/0044684 A1 2/2016 Aziz et al.
2016/0066143 A1 3/2016 Dobyns et al.
2016/0066185 A1 3/2016 Dobyns et al.

OTHER PUBLICATIONS

Admin; Radio Frequency Identification—RFID Handbook; [retrieved Oct. 4, 2016]; 4 pages; Retrieved from <URL: http://rfid-handbook.com/ >.

Agbinya et al.; "Size and Characteristics of the 'Cone of Silence' in Near Field Magnetic Induction Communications"; In: Military Communications and Information Systems Conference; (MilCIS) 2009, Canberra; (Nov. 10-12, 2009); 4 pages.

ECMA International; "Near Field Communication Interface and Protocol (NFCIP-1)"; Standard ECMA-340; (Dec. 2004); 65 pages; $2^{nd}$ Edition.

Finkenzeller; "3: Fundamental Operating Principles"; RFID Handbook: Fundamentals and Applications in Contactless Smart Cards and Identification; (Aug. 2010); pp. 29-59; $3^{rd}$ Edition.

Joint Technical Committee ISO/IEC JTC1 et al.; "Identification cards—Contactless integrated circuit(s) cards—Proximity cards—Part 1: Physical characteristics"; ISO/IEC FCD 14443-1; (Feb. 14, 2007); 8 pages; N 1315.

NFC Forum (A forum leading the way to a world of secure universal commerce and connectivity) [online]; Delaware (USA); (2004); [retrieved Sep. 17, 2010]; 5 pages; Retrieved from <URL: http://www.nfc-forum.org/home/>.

Sandrock et al.; "Wireless Transmission of Speech and Data To, From, and Between Hearing Aids"; The Hearing Journal; (Nov. 2007); pp. 12-16; vol. 60, No. 11.

\* cited by examiner

PROXIMITY BOUNDARY BASED COMMUNICATION

RELATED APPLICATIONS

The present application is a continuation of U.S. patent application Ser. No. 14/841,404 filed Aug. 31, 2015 which claims the benefit of U.S. Provisional Patent Application No. 62/044,125, filed Aug. 29, 2014, the entire specifications of which are hereby incorporated by reference in their entirety for all purposes.

BACKGROUND

Wireless communication has revolutionized society in the 21$^{st}$ century. The way in which people talk, correspond, work, shop, and are entertained has all been changed due to the near omnipresent ability to wirelessly communicate. However, wireless communication is typically not confined to a defined area. Even low power, short range wireless communication standards can be detected over a radius of tens or hundreds of meters. The lack of ability to confine wireless communications to a defined area has limited its use in certain applications and reduced the overall security of wireless communications.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
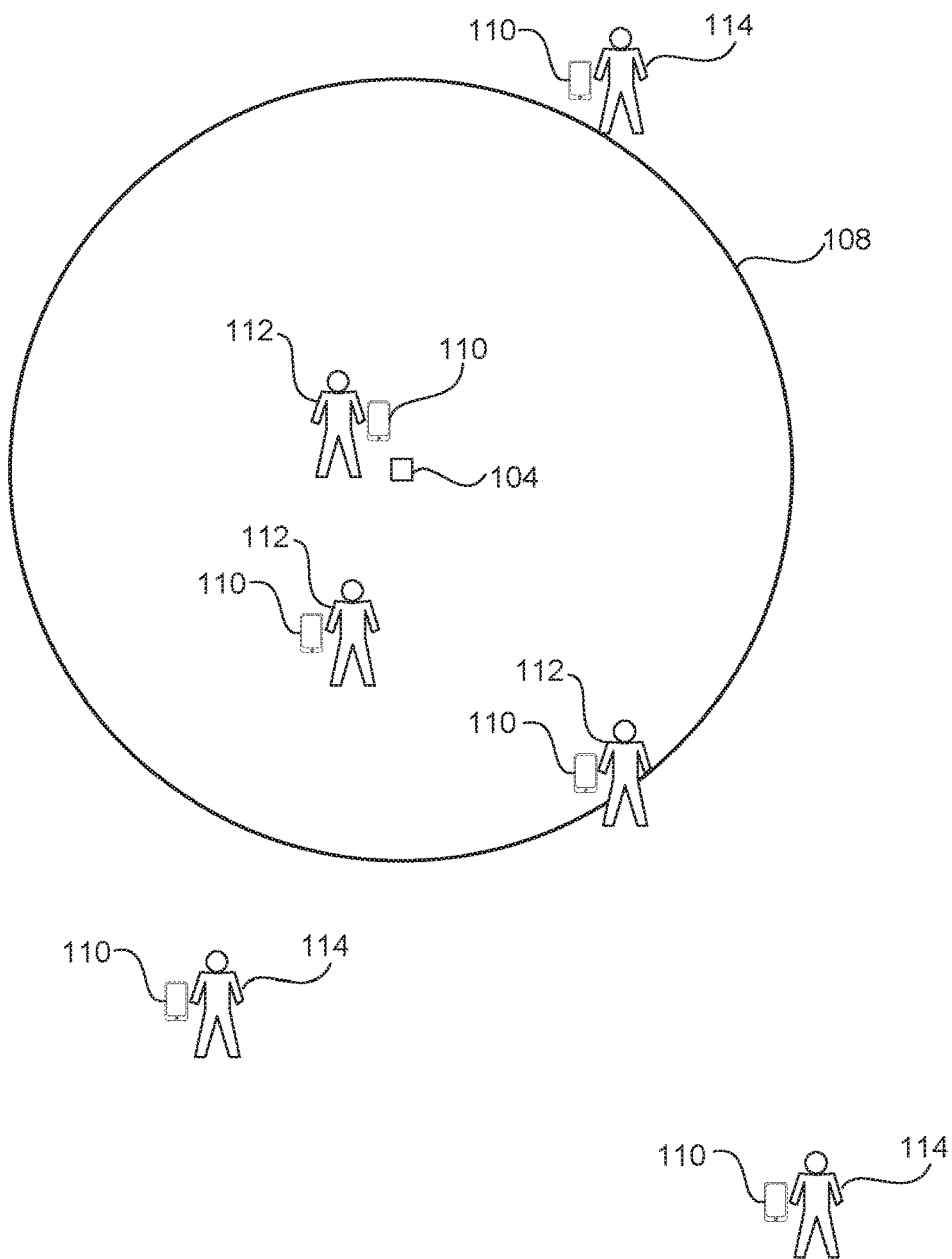
FIG. 1a is an example illustration of a proximity boundary based communication system in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. The following definitions are provided for clarity of the overview and embodiments described below.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

As used herein, the term "NFC compliant device" refers to a wireless communication device that can be compliant with at least one of the ISO specifications including ISO 14443A, ISO 14443B, ISO 18092, and ISO 15693. At the time of writing, the most current ISO 14443 specification for parts A and B consists of four parts: (1) the ISO/IEC 14443-1:2008 disclosing physical characteristics specifications; (2) the ISO/IEC 14443-2:2001 disclosing radio frequency and signal interference specifications; (3) the ISO/IEC 14443-3:2001 disclosing initialization and anti-collision specifications; and (4) the ISO/IEC 14443-4:2001 disclosing transmission protocol specifications. The ISO 15693 specification consists of three parts: (1) ISO/IEC 15693-1:2000 disclosing physical characteristics specifications; (2) ISO/IEC 15693-2:2006 disclosing air interface and initialization specifications; and (3) ISO/IEC 15693-3:2009 disclosing anti-collision and transmission protocol specifications. An NFC compliant device is considered to be compliant if the device is substantially compliant, or expected to be substantially compliant with an accepted version of the ISO 14443, ISO 18092, or ISO 15693 specifications, whether the accepted date is previous to the versions listed above or consists of a future accepted version of the specifications, or has evolved from similar technology over time. The term NFC compliant device can also refer to other types of close proximity communication devices that are not compliant with the ISO 14443 specifications but are configured to communicate at a distance of about 10 cm or less.

As used herein, the term "short range communication (SRC) device" is intended to refer to NFC compliant devices, as well as other types of devices that are configured to communicate using near field magnetic induction (NFMI) within a close proximity of less than about 3 meters from a receiver or transceiver.

As used herein, discussion of a communication from one device to another device may be provided as an example communication between devices but is not intended to be limited to a unidirectional communication. For example, embodiments where a first device sends a communication to a second device are not-limited to a one-directional communication from the first to the second device, but can also include embodiments where the communication is sent from the second device to the first device, or where communications are bi-directionally exchanged from the first device to the second device and from the second device to the first device.

As used herein, the term "mobile computing device" refers to a device including a digital processor coupled to a digital memory. The mobile computing device may be a simple device operable to receive a signal and respond. Alternatively, the mobile computing device can be a complex device having multiple processors and a display screen.

As used herein, the term "radio frequency" or "RF" is used to describe non-proximate far-field propagated electromagnetic radiation used to communicate information via an RF transceiver or RF radio. The power roll-off for an RF electromagnetic signal is approximately one over the distance squared ($1/(dist^2)$), meaning that power density of the emitted RF signal will be one fourth (¼) as strong as the distance between the emitted RF signal and the RF transmitter is doubled.

As used herein, the term "pairing" refers to the communication of sufficient information to one or more mobile computing devices to enable the mobile computing device to form a data link with another mobile computing device. The data link can be a wireless link using NFMI and/or RF. The information used to establish the link can be communicated using NFMI and/or RF to the mobile computing device.

As used herein, the terms customer and user are used synonymously unless otherwise noted. As used herein, the term "cloud based storage" refers to digital storage at a remote location. The digital storage can be any type of digital storage including, but not limited to, magnetic storage, optical storage, and solid state storage devices. The digital storage may be located on a server. A local device, such as a mobile computing device or a proximity computing device can access the digital storage at the remote location via a wireless or a wired connection through a private or public network including, but not limited to a local area network, a personal area network, a wide area network, and an internet connection.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The wireless communication of proximity based information enables a user to send or receive content when the user is within a limited proximity of a location or object. The content may be related to or associated with the location or the object. Also, the sending or receiving of the content may be triggered by the user entering the limited proximity to the location or the object. This may be done to increase the security of the communication link or the data being communicated by limiting the location where data is transmitted or received. Knowing where certain data is permitted to be communicated allows security protocols to be implemented—such as shielding around a room, or limited access of people and or equipment that should not have access to the data or may eavesdrop on the data communications. This may allow data to be communicated more efficiently by limiting the communication of data to a specific location. This can be used to prevent multiple systems from communicated unexpectedly at the same time and place.

In one embodiment, the wireless communication of the proximity based content can be accomplished by wirelessly communicating with a user's mobile computing device, such as a smart phone. While the mobile computing device is described herein as being mobile, the mobile computing device may be a fixed device. The mobile computing device can be a handheld computing device, a portable multimedia device, a smart phone, a tablet computing device, a body worn device, a laptop computer, an embedded computing device or similar device. An embedded computing device is a computing device that is inlayed in a selected object such as a vehicle, a watch, a bracelet, a key fob, a ring, a key card, a monitoring device, a remote sensor, a measurement device, a dispensing device, a clipboard, an implanted medical device, a token, a poker chip, a souvenir, a necklace amulet, an electronically enabled article of clothing, an appliance, a tool, a weapon, and so forth. A computing device may be embedded in substantially any type of object. The mobile computing device can be a device that is user owned, rented, leased, associated with, or otherwise in the possession of the user. A user owned device can include mobile computing devices that are actually owned by relatives, friends, and employers of the user.

In one embodiment, wireless communications can be enhanced by the use of spatially enabled communications. Spatially enabled communications, as used herein, is the enhancement of wireless communications based on proximity control, proximity based security, and/or a determination of relative spatial location. The spatially enabled communications can be accomplished using short range communication (SRC) devices, as described herein.

The ability to sharply define a desired proximity boundary can provide a significant advantage for the spatially enabled wireless communications. If an edge of the proximity boundary is substantially variable, a user may detect and/or receive content for locations or objects that may not be visible or easily discovered by the user. Certain types of ubiquitous wireless standards may not be useful to sharply define the proximity edge. Standards such as Wi-Fi, also known by the 802.11 standard from the Institute of Electronic and Electrical Engineers (IEEE), utilize Radio Frequency (RF) signals that can have a range of hundreds of feet. The RF signal may be detected in certain situations well outside of the desired range. More localized standards, such as Bluetooth® can have the same challenge, albeit for a smaller range. A typical range for a Bluetooth device can be approximately 10 meters or about 30 feet.

In accordance with one embodiment of the present invention, an SRC device can include a short range transceiver that can be configured to communicate using Near Field Magnetic Induction (NFMI). Unlike RF signals, which are created by modulating information onto an electromagnetic plane wave and transmitting those signals into free space, NFMI signals are created by modulating information onto a magnetic field. The magnetic field is localized around the transmitting antenna. The signal outside of this localized region is typically attenuated below the noise floor, thereby making it difficult or impossible to receive the signal. The power roll-off for an electromagnetic signal is one over the distance squared ($1/(dist^2)$), meaning that every time the distance is doubled, the power is one fourth (¼) as strong. In contrast, the power roll-off for a NFMI signal is proportional to one over the distance to the sixth ($1/(dist^6)$), meaning that every time the distance is doubled, the power is one sixty-fourth (¹⁄₆₄) as strong. Thus, the use of NFMI can enable a signal that can be transmitted predictably within a well-defined area or distance.

However, the edge of the proximity boundary may be variable even when NFMI is used. One challenge with communicating through the use of magnetic induction is the polarization of the signals relative to the transmitter and receiver antennas. Maximum power in an NFMI signal can be communicated between two NFMI antennas with axis that are parallel to one another. Minimum power is transmitted between two antennas with antenna axis that are perpendicular to one another. The difference in transmitted power can be significant.

For instance, at 1 meter, the power received in an NFMI signal transmitted between two antennas that are substantially parallel to each other can be 50 decibels (dB) greater than the power received when one of the antennas is substantially perpendicular to the other.

The transmitter typically has no way of knowing the orientation of the receiver antenna, therefore it must transmit at the maximum (worse case) power setting of +50 dB to ensure a link distance of 1 meter when the antennas are perpendicular with one another.

In an NFMI system, the power roll-off is 60 dB per decade. Therefore 50 dB correlates to 0.833 decades (50 dB/60 dB) or an increased link distance of 6.8 times (10^0.833). Thus, if the transmitter and receiver antenna are optimally positioned (i.e., parallel) while the transmitter is at full power (+50 dB), the link distance will reach out to 6.8 meters instead of 1 meter. This means that an NFMI link will have a range from approximately one to seven meters. This wide range, which depends on the orientation of the transmitter and receiver antennas, substantially reduces the ability to sharply define a selected proximity around a location or object.

One way of dealing with the challenge of a variable proximity edge caused by antenna misalignment is to design one or both of the transmitter and receiver with multiple orthogonal antennas. This ensures that at least one of the receiving antennas will be substantially parallel to the transmitting antenna regardless of the relative alignment between the transmitter and the receiver. In one embodiment, the signal can be received at a receiver having multiple orthogonal antennas. A portion of the signal can be received on each of the orthogonal antennas and summed, thereby maximizing the signal no matter the orientation. Alternatively, one or more of the antennas can be selected to transmit or receive based on strength of the signal.

The SRC device associated with the location or object can also include multiple orthogonal antennas, enabling the device to receive NFMI signals broadcast from the user's mobile computing device no matter what the orientation is between the two transceivers. In one embodiment, the antenna that is used to receive the signal can also be used to transmit. The antenna may be used to transmit on the assumption that it is the best aligned antenna with the antenna on the receiving transceiver, thereby maximizing the link distance and minimizing the power needed to communicate between the two transceivers. This, in turn, reduces the emission levels of the transceiver.

In one embodiment, the use of multiple antennas to communicate a signal is referred to as antenna diversity. When the antennas are used to communicate a magnetic induction signal, antenna diversity refers to the use of multiple orthogonal antennas that are directly connected to a single transceiver. This is different than antenna diversity used in transmission schemes such as Multiple Input Multiple Output (MIMO), wherein multiple antennas are used to perform spatial multiplexing to decrease signal loss through channel fading. The use of multiple orthogonal antennas to receive a magnetic induction modulated signal will be referred to as magnetic induction diversity. In one embodiment, the use of magnetic induction diversity can be used in combination with spatial diversity to allow the benefits of both spatial diversity and magnetic induction diversity to be accomplished.

Magnetic induction diversity can be the selection of the best aligned antenna to receive or transmit with another transceiver. Alternatively, magnetic induction diversity can involve summing the signal on two or more antennas. The use of magnetic induction diversity enables the variability of the proximity boundary to be substantially reduced. Since, in a system with multiple receiver antennas positioned in orthogonal planes, a receive antenna can always be selected that is significantly aligned (i.e., parallel) with a transmit antenna, it reduces the need to significantly increase the transmit power to ensure that the signal can be received at a selected distance independent of its relative orientation with the transmit antenna, and vice versa. It should be noted that the use of NFMI transceivers does not, by itself, constitute magnetic induction diversity. The distance over which a magnetic induction device can communicate (i.e. a range) when using magnetic induction diversity can depend on a number of factors, including but not limited to a communication range of a transmitter and a receive sensitivity of a receiver. A number of additional factors can also contribute including the degree of orthogonality, the number of transmit and receive antennas, the shape and size of the antennas, the transmitter output power, the efficiency of the receiver, and so forth.

The transmit power in each of the NFMI transceivers can be set at a level to define a desired radius of a proximity boundary. The transceivers may be designed so that the proximity boundary may be substantially circular. Alternatively, the antennas on the short range transceiver associated with the product can be designed to provide a radiation pattern of a desired shape, such as a narrow arc or conical pattern.

Proximity Boundary Based Communication

In one example embodiment, illustrated in FIG. 1a, a proximity boundary 108 is illustrated. A proximity SRC (PSRC) device 104 can be configured to communicate using NFMI within the range of the proximity boundary. The PSRC device can be a proximity computing device that includes at least one NFMI transceiver coupled to a computing device. The PSRC is typically located at a fixed position, but may be configured as a mobile device. A user 112 can carry a computing device 110, such as a mobile computing device having an SRC device configured to receive an NFMI signal broadcast by the PSRC device 104. While the term mobile computing device is used in this example, it is not intended to be limiting. The SRC device can also be coupled to an immobile computing device, or to a mobile computing device configured to be located at a fixed location.

If both the SRC device on the mobile computing device 110 and the PSRC device 104 include only a single antenna, then the power of the NFMI signal transmitted from the PSRC device needs to be sufficient to ensure that the signal can be received at the mobile computing device 110 at the perimeter of the proximity boundary 108 even when the antenna of the SRC device at the mobile computing device 110 and the antenna of the PSRC device 104 are poorly aligned (i.e., substantially perpendicular). As previously discussed, the power needs to be increased approximately 50 dB (i.e., 10,000 to 100,000 times) for this to be achieved.

However, when the antennas of the SRC device at the mobile computing device 110 and the PSRC device 104 are better aligned, and the power is increased by 50 dB to accommodate the poorly aligned antennas, then the NFMI signal can be received anywhere within a radius that is approximately seven times greater than the proximity boundary 108. A user 114 having a mobile computing device 110 with an antenna that is coaxial to or parallel with the antenna of the PSRC device 104 may detect the NFMI signal a significant distance from the PSRC device. In fact, each person illustrated in FIG. 1 may be able to detect the signal based on the alignment of the respective antennas.

If one or both of the PSRC device 104 and the SRC device on the mobile computing device 110 included multiple orthogonal antennas that use magnetic induction diversity to receive and/or transmit the NFMI signal, it can be ensured that the receiver and transmitter antenna are substantially optimally aligned, thereby enabling a substantially maximum amount of the possible power to be received independent of the position or orientation of the SRC antenna at the mobile computing device 110 relative to the antenna of the PSRC device 104. This enables the uncertainty area (i.e., the area between the outer circle 114 and the inner circle 108) to be substantially reduced, thereby enabling the PSRC device to be designed with a desired proximity area with minimal uncertainty area.

The size of the proximity boundary 108 and the uncertainty area outside of the proximity boundary is determined by the transmit power of either the PSRC device 104 or the SRC device on mobile computing device 110, the receive sensitivity of either the PSRC device 104 or the SRC device on mobile computing device 110, and/or antenna alignment. These factors, individually or in combination, can facilitate optimal communication coupling which provides a well-defined edge of the proximity boundary.

The NFMI signal broadcast by the PSRC device 104 can be used to indicate to the mobile computing device 110 that the user 112 is located within the proximity boundary 108. In one embodiment, the NFMI signal can be a proximity signal which can provide information that indicates a security permission for the user to communicate selected data using the user's mobile computing device.

In one embodiment, the security permission can be communicated in a secure, encrypted format from the NFMI transceiver coupled to the PSRC device 104 to communicate with the NFMI transceiver coupled to the mobile computing device 110. Alternatively, the security permission may be sent in an unencrypted format, relying on the proximity security of the NFMI signal that is communicated substantially only in the proximity boundary 108.

In one embodiment, the selected data is communicated using the mobile computing device 110 only while the mobile computing device remains within the proximity boundary 108. If the NFMI signal broadcast by the PSRC device 104 is no longer received at the mobile computing device 110, then the ability to communicate the selected data using the mobile computing device can be disabled.

In another embodiment, once the security permission is received at the mobile computing device 110, the mobile computing device 110 can be configured to communicate the selected information for a selected time period, at a selected time period, or perpetually, irrespective of the mobile computing device's location with respect to the PSRC device 104.

For example, in one embodiment, a mobile computing device 110 can move to within a proximity boundary 108 of a PSRC device 104. The PSRC device 104 may be located in a computing device in an automobile or a mobile computing device used by another person, or at a selected location. The PSRC device can communicate selected data, comprising pairing information to allow the mobile device to pair with another computing device. The pairing may be a Bluetooth pairing to another device. Alternatively, pairing can comprise sending sufficient information to the mobile device that the mobile device can connect with another computing device using NFMI communication or an RF communication standard, such as WiFi or 3GPP LTE, as previously discussed. Just by being within proximity, the permissions to pair with another computing device can be set, thereby enabling pairing to occur passively based on a proximity to a specific location or another device. Alternatively, an additional security measure can be implemented, such as requiring a manual operation by a user such as pressing a pairing button on the mobile computing device to initiate a pairing process with another computing device.

The security permission can grant permission at the mobile computing device 110 to transmit, receive, or transmit and receive the selected data. For instance, in example embodiments, the selected data can be received from the PSRC device 104, transmitted to the PSRC device, or received from and transmitted to the PSRC device.

The selected data may be communicated between the mobile computing devices 110 using the NFMI transceivers to maintain spatial security of the selected data within the proximity boundary 108. In another embodiment, the selected data can be communicated using a radio frequency communication standard, such as Bluetooth, IEEE 802.11-2012, 802.11ac-2013, 802.11ad, 802.11ax, IEEE 802.15, IEEE 802.16, third generation partnership project (3GPP) long term evolution (LTE) Release 8, 9, 10, 11, 12 or 13, an optical link, an acoustic link, a wired link, and so forth. This allows communication protocols that are inherently non-proximate in their communication behavior, such as Bluetooth, Wi-Fi, or 3GPP LTE, to function effectively in proximity based applications. Proximity applications can include, but are not limited to, marketing, medical monitoring, secure communications, localized intercoms, proximity payment systems, or other types of proximity based applications where the location of one device relative to another can be important.

Figure 1B:
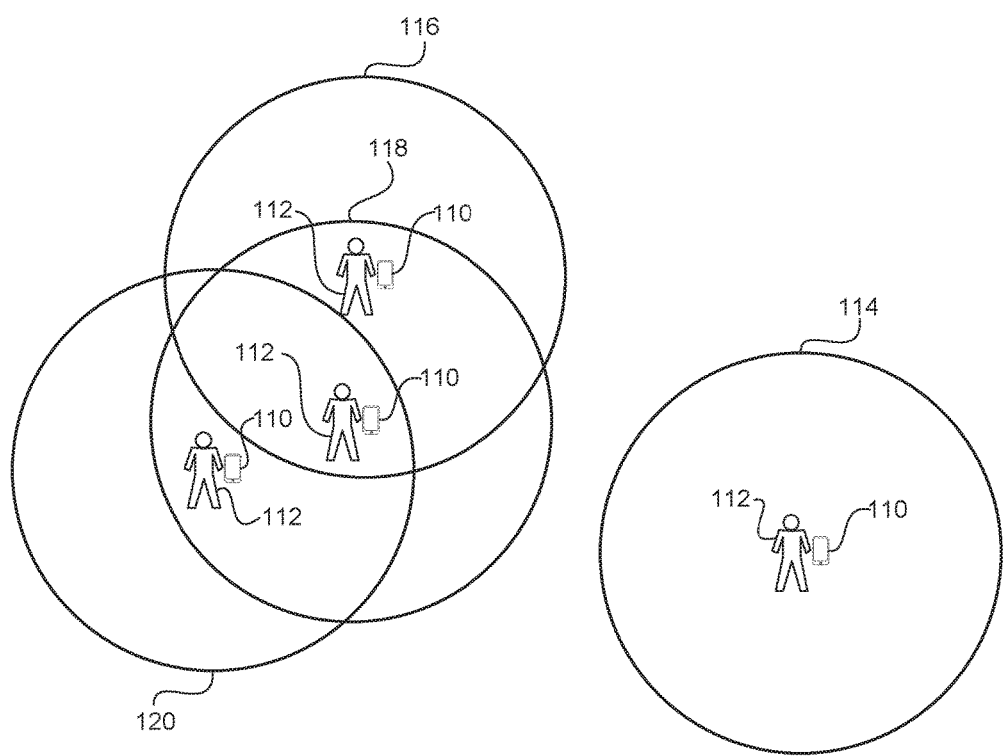
FIG. 1b illustrates another example of a proximity boundary based communication system in accordance with an embodiment of the present invention.

FIG. 1b illustrates another example, wherein an NFMI signal can be communicated between the NFMI transceivers of two mobile computing devices 110. A separate proximity boundary 114, 116, 118, 120 is illustrated around each mobile computing device 110.

While the same diameter is illustrated for the proximity boundary of each mobile computing device, this is not intended to be limiting. The diameter of a proximity boundary can be selected based on the system design and needs of each mobile computing device. As previously discussed, the distance over which a magnetic induction device can communicate (i.e. a range) when using magnetic induction diversity can depend on a number of factors, including but not limited to a communication range of a transmitter and a receive sensitivity of a receiver. The NFMI transceiver coupled to a mobile computing device can be designed to achieve a proximity boundary of a desired size. A practical size can vary from several centimeters to several meters, depending on the design of the antennas, transmitter, and receiver. Larger proximity boundary sizes can be achieved with a relatively large amount of power, as can be appreciated.

In the example of FIG. 1b, the proximity diameter can be approximately 3 meters. When the user 112 in proximity boundary 116 is located within a distance of less than 1.5 meters from the user in proximity boundary 118, an NFMI signal can be broadcast by one of the SRC devices coupled to the mobile computing devices 110. The NFMI signal can be used to indicate to the mobile computing device 110 that another user 112 is located within the proximity boundary 116 or 118. As previously discussed, the NFMI signal can include a security permission that enables the mobile computing device to communicate selected data between the mobile computing devices 110. The selected data can be communicated between the mobile computing devices using NFMI transceivers or RF radios, as previously discussed.

The selected data can be communicated between the mobile communication devices once the security permission has been received (i.e. once the mobile communication devices come within the proximity boundary radius and the appropriate data/signal has been exchanged or received). Alternatively, the selected data may be communicated only when the mobile communication devices remain within a proximity boundary radius.

In FIG. 1b, the user 112 within the proximity boundary 118 is located within the proximity boundary 116 and 120, thereby enabling the user to receive security permissions from the users in the other proximity boundaries and communicate selected data with both users. Conversely, the user 112 in proximity boundary 114 is not located within the proximity boundary of any other user. Therefore, the user is not able to communicate the selected data with another SRC device or PSRC device coupled to a mobile computing device 110.

Figure 2A:
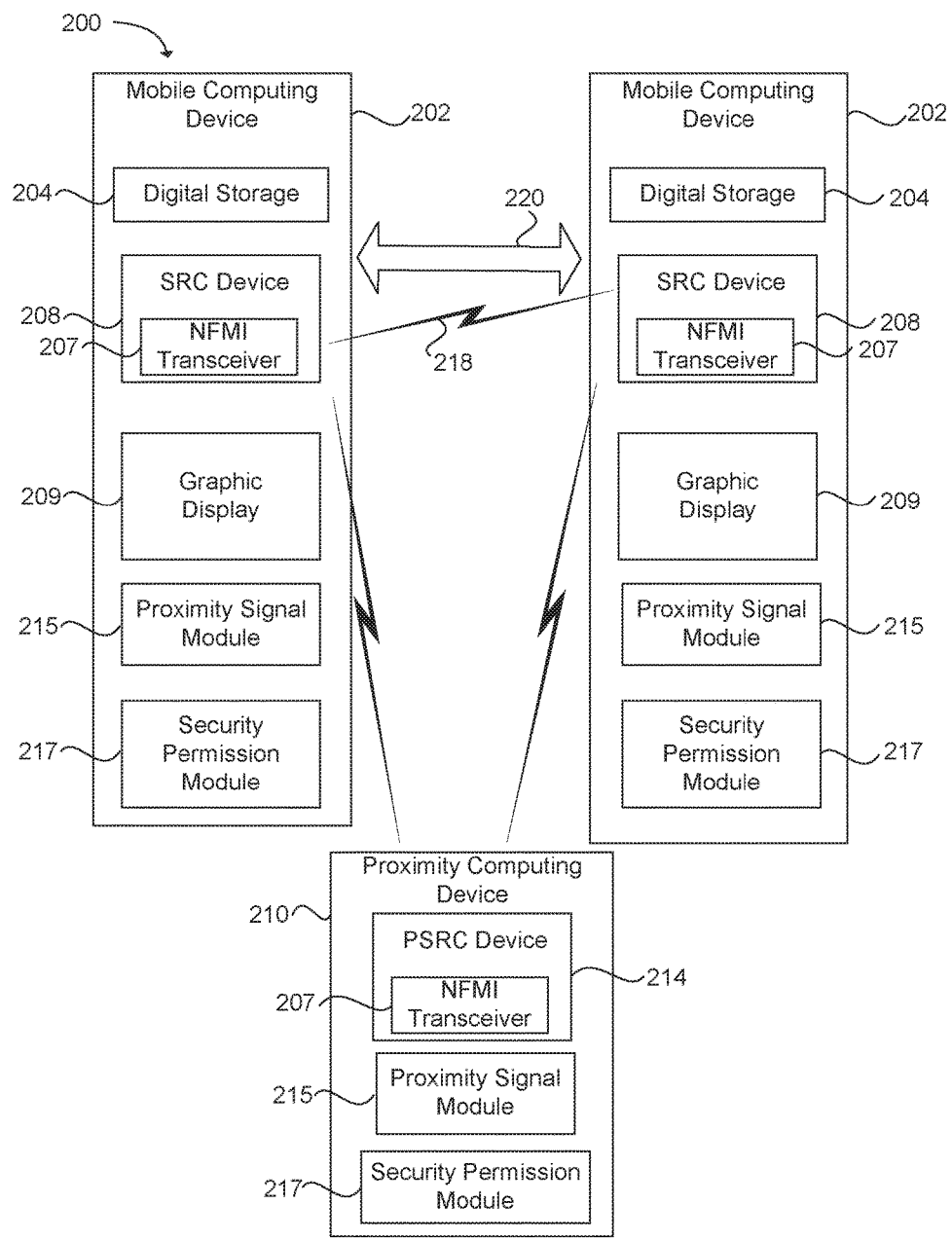
FIG. 2a illustrates a block diagram of an example illustration of a mobile computing device having an SRC device with an NFMI transceiver in accordance with an embodiment of the present invention.

FIG. 2a illustrates an example block diagram of a system for communication based on a location of a proximity boundary, in accordance with an embodiment of the present invention. While the proximity boundary based communication system 200 is illustrated in FIG. 2a and described herein, the constituent elements and functions thereof may be equally applicable to other implementations of the wireless communication of proximity based content.

Referring to FIG. 2a, the proximity boundary based communication system comprises one or more mobile computing devices 202. As described in the preceding paragraphs, each mobile computing device 202 can be a handheld computing device, a portable multimedia device, a smart phone, a body worn device, an implantable device, embedded in a medical device, a military communication system, a military weapons system, integrated in an automobile, a tablet computing device, a laptop computer, an embedded computing device or similar device.

The mobile computing device 202 can be a mobile computing device that is owned by, or otherwise associated with, the location (i.e. a store, a hospital, a business, a military facility, etc.) in which the mobile computing device is used. Alternatively, the mobile computing device 202 can be a mobile computing device that is not owned by the store in which it is used. In other words, the mobile computing device 202 can be a device that is customer/patient/user/operator owned, rented, leased, associated with, or otherwise in the possession of the customer/patient/user/operator. A customer owned device can include mobile computing devices that are actually owned by relatives, friends, employers, or other types of associates of the customer.

The mobile computing device 202 can include a digital storage 204. The digital storage 204 may be a magnetic digital storage such as a hard disk, an optical digital storage such as an optical disk, a solid state digital storage such as a Dynamic Random Access Memory (RAM) or a persistent type digital storage such as a flash RAM. Other types of digital storage may also be used, as can be appreciated. The digital storage 204 may be integrated in the mobile computing device 202. Alternatively, the digital storage 204 may be located in a cloud computing storage site that is in wireless communication with the mobile computing device 202. Access to the cloud computing storage site can be controlled by and limited by the user or owner of the mobile computing device 202. Access to the cloud computing storage site may be granted to others by the user and/or owner. In one example embodiment, the cloud computing storage site can be accessed via a security permission received from a proximity computing device 210 or another mobile computing device 202.

The mobile computing device 202 can include an SRC device 208 that is coupled to the mobile computing device 202 and enables the mobile computing device 202 to transmit and receive information within a defined area using an NFMI transceiver 207. The SRC device 208 can be integrated with the mobile computing device 202. Alternatively, the short range communication device may be an external device, such as a dongle, that can be plugged into the mobile computing device 202 to enable information to be sent from and received by the mobile computing device 202.

The mobile computing device 202 can also include a graphic display 209, such as a liquid crystal display (LCD) screen, organic light emitting diode (OLED) display screen, or the like. The graphic display screen can be used to display visual information regarding a location of the mobile computing device within the proximity boundary. While a graphic display is illustrated in FIG. 2a, it is not required. Certain types of mobile computing devices 202 may not include a graphic display, or may be connected to an external graphic display device.

A PSRC device 214 can be disposed in a proximity computing device 210 that is located at a selected location. The PSRC device is typically placed at a fixed location and used to define a selected a selected proximity boundary. The PSRC device can transmit a proximity signal within the selected proximity boundary of the fixed location using a proximity signal module 215. When a mobile computing device 202 with an SRC device enters the fixed location of the proximity boundary, and receives the proximity signal, a security permission can be communicated from a security permission module 217 at the PSRC device to the SRC device, thereby enabling the SRC device to transmit or receive selected data, as previously described. While the example has illustrated communication from the PSRC device to an SRC device, this is not intended to be limiting. The SRC device can also transmit proximity signals and security permissions to the PSRC device. One or both of the SRC device or the PSRC device can then transmit or receive the selected data based on the security permission.

For example in a medical environment, the selected location may be a hospital room, a body-worn device on a patient, or a hospital bed. The SRC device, operating with a mobile computing device, can be embedded in a doctor's or nurse's clipboard while the PSRC device can be embedded in a medical monitoring device. The SRC device in the mobile computing device can be a body-worn medical monitoring device or sensor.

In addition to uses in medical environments, the PSRC and SRC devices can be located in any number of situations and locations. For example, the PSRC device can be located in a vehicle and the SRC device is a smart phone or car key. The PSRC may be a vehicle or an intercom and the SRC device can be in a portable radio on a soldier or in a weapon.

The system illustrated in the example of FIG. 2a is configured to establish a short range wireless communication link 218 between the SRC device 208 and a PSRC device 214 or another SRC device 208 when the mobile computing device 202 is within a selected distance 220 of the proximity computing device 210. In one embodiment, the short range wireless communication channel may only communicate using near field magnetic induction communication. The short range wireless communication channel can be referred to as a proximity communication channel. At least one of the SRC device 208 and the PSRC device 214 can have a plurality of antennas and use magnetic induction diversity to identify the best antenna or a plurality of signals to transmit and/or receive a signal. In one embodiment, the selected distance 220 between the two devices may be less than or equal to a near field distance, which is approximately a wavelength of the carrier signal ($\lambda$) divided by 2 pi ($\lambda/2\pi$).

Figure 2B:
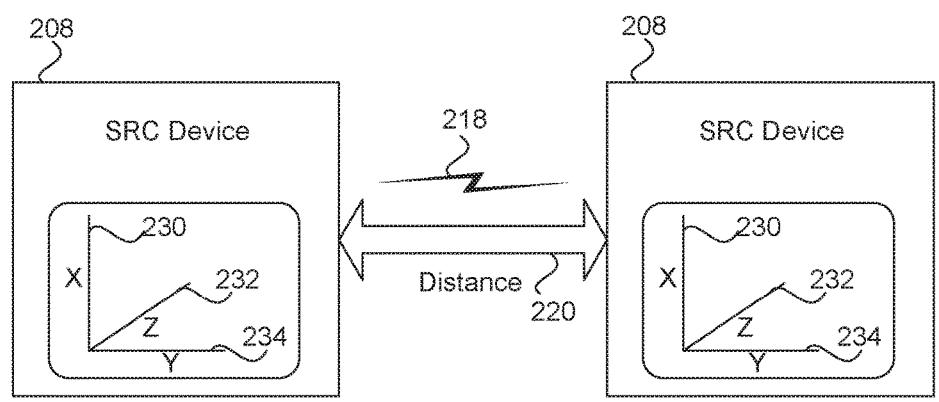
FIG. 2b illustrates a block diagram of an SRC device with multiple orthogonal antennas to provide spatially defined security permissions in accordance with an embodiment of the present invention.

As illustrated in FIG. 2b, the SRC device 208 can include multiple orthogonal antennas 230, 232, 234. The multiple orthogonal antennas can be used to provide magnetic induction diversity, thereby enabling the proximity boundary to be relatively sharply defined, as previously discussed. In one embodiment, each SRC device 208 can include two or more orthogonal antennas. In another embodiment, one SRC device may have a single antenna and another SRC device can include two or more orthogonal antennas.

A communication range of one of a first SRC device and a second SRC device that includes at least two antennas, can be used to define one or more dimensions of a proximity boundary, as previously discussed in the preceding paragraphs. It should be noted that, the mere use of multiple orthogonal antennas does not guarantee the definition of a relatively sharply defined proximity boundary. Rather, the use of the multiple orthogonal antennas, combined with the selection of components with desired tolerances can provide a relatively sharply defined proximity boundary. The tolerances of components in the SRC can be designed and selected to provide a desired proximity boundary that is relatively sharply defined. Components in both the transmit chain, receive chain, RF front end, and antennas can be selected to provide the desired tolerance in the proximity boundary. The design and selection of filters, amplifiers, receivers, transmitters, antennas, and other RF components can provide the desired tolerance of the proximity boundary. The desired tolerance of the boundary can depend upon its intended use and intended use location.

In one example, it can be desirable to select and design components of the SRC devices to define a proximity boundary of approximately 9 feet in diameter. It can be acceptable to have another SRC device detect a proximity signal within 3 feet of the designed 9 foot diameter boundary. Thus, an SRC device may be able to detect the proximity signal when 12 feet from another SRC device or PSRC device.

In another example, it can be desirable to select and design components of the SRC devices to define a proximity boundary of approximately 3 feet in diameter. The proximity boundary can be configured to operate near other SRC devices with proximity boundaries. Accordingly, in order to provide a relatively sharply defined proximity boundary, the components of the SRC device can be selected so that the SRC device cannot detect a proximity signal at a distance of greater than 4 feet from another SRC device or PSRC device. These examples are not intended to be limiting. An SRC device, and the components of the SRC device, can be selected and designed with components that are capable of providing a proximity boundary with desired dimensions and a sufficiently sharp boundary to allow the SRC device to function as desired. The use of NFMI communication, multiple orthogonal antennas, and components with desired tolerances can enable the definition of a desired proximity boundary.

Proximity Boundary Based High Speed Communication

In one embodiment, a radio frequency communication standard for non-proximate communications, such as Bluetooth (BT), can be used to form a communication link in a proximity-based application. Because of the physical properties of the Bluetooth energy (propagating electromagnetic wave), a mobile computing device using Bluetooth is not able to reliably ensure when the mobile computing device is within a specific distance of another BT enabled device. However BT technology, or other types of RF communication standards, is typically capable of transmitting information at a higher data rate than NFMI technology. Accordingly, the two radio access technologies can be integrated to form a multi-Radio Access Technology (MRAT) device that is configured to allow the NFMI link to determine when a proximity event occurs (i.e. the computing device with an SRC device is located within the proximity boundary of a PSRC device or another computing device with an SRC device) and then permit or signal the BT link to exchange the desired information. If the computing device with the SRC device exits the proximity boundary of the PSRC device or another computing device with the SRC device, then the BT link can be unpermitted to exchange the desired information. In other words, a permission to exchange the desired information can be revoked.

While an example of communicating via a BT RF radio link is provided, it is not intended to be limiting. Other types of RF communication standards that can be used to broadcast data when a proximity even occurs include, but are not limited to, IEEE 802.11-2012, 802.11ac-2013, 802.11ad, 802.11ax, IEEE 802.15, IEEE 802.16, third generation partnership project (3GPP) long term evolution (LTE) Release 8, 9, 10, 11, 12 or 13, an optical link, an acoustic link, and so forth.

One example of a proximity event used to trigger a communication via another radio access technology is a proximity-based advertising application. In order to effectively target a user for proximity based advertising, the system can be configured to be aware of when a potential customer or user is within a specified distance of the location, good, or service. Once this location has been verified via NFMI technology, by receiving a proximity signal sent from an NFMI transceiver, as previously described, the system can use a different radio access technology to enable higher data rates to transfer selected data, such as text, images, audio or video. The selected data can be communicated for an advertisement or provide information for a product within the user's proximity. The selected data can be communicated using a non-proximate radio frequency standard communication more quickly than the information typically can be communicated using only a proximity communication technology such as NFMI.

The ability to communicate desired information more quickly enables the user to become aware (i.e. via an alert) of a promotion being offered before the user has passed out of the target location. In addition, if there is a large amount of data being communicated (security information, encrypted information, graphics, audio, video, or other large data) the user may become frustrated if the interaction is slow. If the information is communicated slowly, then it may defeat the 'positive experience' that a marketer typically desires to share with a user.

Another example of a proximity event used to trigger a communication via a broadband radio access technology is a proximity data transfer device. In one embodiment, a user can download information on a mobile computing device while in proximity of a PSRC placed at a selected location and associated with the location or an object at the location. For example, a PSRC device associated with an interactive movie poster can be configured to download or stream the contents of a movie or movie trailer. The system can be activated by a proximity event determined by the NFMI link between the PSRC and an SRC device in the user's mobile computing device. However the NFMI link may not provide an adequate data rate to stream video. Therefore an additional radio access technology operable to use a high(er) data rate allows the information to be exchanged effectively.

In one embodiment, proximity events used to trigger broadband communications, such as the interactive movie poster example, can be configured such that the user remains within the proximity location in order to continue accessing the data (i.e. watching video, listening to music, accessing a database, participating in a wireless network, and so forth). The use of NFMI transceivers in the SRC device and the PSRC device can be configured to form a proximity boundary of a selected size, such as 1 to 3 meters. A user within the proximity boundary can continue to participate in the proximity event. Other types of short range protocols, such as near field communications (NFC), operate in an extremely small region, such as a few centimeters. Such a small area is too constrictive for a user to continuously hold their mobile computing device within the same small location for any length of time. Conversely, an RF (non-proximate far-field) communication standard, which communicates tens to thousands of meters, does not provide the localization that the use of the NFMI technology can provide.

Proximity Based Event with Long Range Data Transfer

In another embodiment, the SRC device in the mobile computing device or the PSRC device can be used to pair the mobile computing device to form a connection using a separate radio access technology with another wireless device to enable the mobile computing device to communicate via a broadband and/or long range communication standard. When the mobile computing device enters a proximity boundary, the SRC device can be configured to communicate and/or receive sufficient information to establish an RF radio link with the other wireless device using a selected radio access technology such as Bluetooth, WiFi, 3GPP LTE, and so forth.

The ability to pair with another wireless device to establish the RF radio link can provide significant advantages. While radio access technologies configured to operate in licensed portions of the radio spectrum, such as cellular systems, are configured to operate with a known group of trusted devices, systems operating in unlicensed portions of the radio spectrum, such as WiFi and Bluetooth typically do not have the ability to identify trusted devices. In addition, it can be difficult to identify other unknown devices and establish the necessary information to form a radio connection with those devices. Using the NFMI radios to communicate the necessary information to establish a WiFi, Bluetooth, or other desired radio link can provide security and reduce the amount of power used to attempt to access unknown devices. The pairing information can also allow the mobile computing devices to trust the data links that they are connected to.

Accordingly, a mobile computing device can be paired to a specific wireless system/network by bringing the device within the proximity boundary of the SRC device. The proximity boundary can be within the coverage area of a longer range communication standard, such as WiFi or Bluetooth.

As previously discussed, a short range system such as an NFC system has a coverage area of only a few centimeters. It may not always be convenient to limit this proximity range to a distance that is so small or restrictive that the user is required to physical hold the wireless device within a specified location. For example the device to be programmed may be a body-worn device on a patient, or an embedded device within the patient's body, or a communication system that is not easily removed like a helmet or backpack.

Accordingly, the SRC device can be used to define a proximity boundary that is limited in area relative to the non-proximate wireless system/network, but large enough that it is conveniently accessible to the user or device to be paired. In addition, the proximity area may be located so that the user does not have to take any specific action on their part to initiate the pairing process.

For example, a PSRC device or an SRC device may be assigned to a specific patient in a hospital. A caregiver can enter the patient's room or stand next to the patient's bed with a mobile computing device (clipboard, smartphone, tablet . . . ). The SRC device in the mobile computing device can be within the localized proximity boundary created by the NFMI system in the PSRC or SRC device assigned to the specific patient in the hospital. A security permission can be communicated, via the SRC device, to the mobile computing device. The security permission can be used to authenticate the mobile computing device to another wireless network, such as a WiFi or Bluetooth network, thereby enabling the mobile computing device to be able to access data, even after leaving the proximity boundary via a longer range wireless protocol such as Wi-Fi.

For example, the caregiver can leave the patient's room and go back to their work station while continuing to access the patient's data via a Wi-Fi system. If the caregiver enters a different patient's room, the mobile computing device can receive a security permission from an SRC device or a PSRC device associated with the different patient to allow the caregiver to access information associated with the different patient via the WiFi system. Alternatively, each patient can be associated with a different WiFi access point (AP). The security permission can provide information that enables the mobile computing device to access the WiFi system via the AP associated with a patient.

It should be noted that the proximity event may not just assign a mobile device to a wireless system, but may also be used to control permissions to allow a mobile computing device to access data within the same wireless system.

For example a hospital may have one large wireless network accessible by a non-proximate wireless protocol such as Wi-Fi, and a mobile device can be assigned specific permissions based on the proximity boundary that the mobile device is brought within. The mobile device remains paired with the same wireless system, but is able to access different data based on the device's proximity within the network, such as each patient's data.

To further clarify, a nurse may have an electronic application on a mobile computing device such as a tablet that enables the nurse to record patient notes. The security permissions received while the computing device is within a proximity boundary, using NFMI via the SRC or PSRC device, can enable the mobile computing device to only allow access to the patient records that the nurse is currently visiting, or had previously visited. Patient access can also be based on a length of time since the nurse visited the patient and was located within a defined proximity boundary created between SRC devices. When the nurse enters a different patient's room, and has left the proximity boundary, the security permission may no longer be received, thereby removing permission to access the previous patient's data.

The ability to only access a patient's data only from within a defined proximity boundary can reduce errors by ensuring that data that is recorded is for the patient within the proximity boundary.

Another example comprises a non-proximate wireless intercom system configured to operate in an unlicensed portion of the radio spectrum (e.g. 900 MHz, 2.4 GHz . . . ) where wireless headsets (and microphones for bidirectional communication) can communicate to each other or to a central communication device's hub. Each intercom device can be paired to the communication network to prevent each intercom device from communicating with or being interfered with by other wireless systems within range of the wireless RF signal. Typically, each intercom device is configured to undergo a pairing procedure to assign a device to a specific network. This can be accomplished via software programming, hardware jumper settings (such as a dip-switch) to set the specified code, or a wireless pair-over-air process.

When devices are paired wirelessly (over the air), proper care must be taken to ensure that the device pairs with the intended communication network—especially if a second communications network operating on the same wireless standard is nearby. This problem can be resolved in some instances by requiring a passcode to be entered by at least one of the nodes or devices being paired.

For example, when a Bluetooth device is paired, one node can be put into search mode to detect the presence of another Bluetooth enabled node with which to communicate. Often one node will have a passkey (0000 for example) that is to be set on one device to authenticate the pair-over-air process.

Many recent inventions/products allow for devices to be paired wirelessly through short range communication protocols to reduce the complexity of the pair-over-air process. Such systems may implement a short range physical layer such as magnetic induction or NFC to reduce the probability of inadvertently pairing a device with other nearby networks by ensuring that the short-range physical layer link distance is much more localized than the anticipated distance between other networks. These systems often require the device-to-be-paired to be brought very close to a specific node or location in order to initiate the pairing process. Many configurations require that the devices 'bump' or 'kiss' each other as the short-range link distance is less than a few centimeters or even a few millimeters. While these solutions simplify the process, they require a specific action on the user's part to complete the pairing routine.

In contrast, an NFMI equipped system, such as a mobile computing device with an SRC device, can be used to communicate sufficient information within a defined proximity boundary to carry out the pairing process without the user being required to 'bump' devices. For example, a vehicle intercom system only requires that a user enters the vehicle or is located within a close proximity to the vehicle. The NFMI equipped system can detect the presence of the device to be paired and can carry out the pairing process without any action on the part of the user. The NFMI range (i.e. the proximity boundary), typically a few meters in diameter, can be designed to be long enough to allow the pairing process to occur passively (without a specific action by a user) but is localized enough to prevent the device from pairing with another intercom system in the area. Once the device is paired, the user is free to move away from the predetermined proximity location and is able to communicate via a 'long-range' wireless protocol, as previously discussed.

In one example, the power roll-off for an NFMI signal is proportional to one over the distance to the sixth ($1/(dist^6)$), meaning that every time the distance is doubled, the power is one sixty-fourth ($1/64$) as strong. Accordingly, the power of an NFMI signal quickly falls below a detectable level. Without the use of very specialized equipment, an NFMI signal that is intended to be received at a selected distance, such as three feet, typically cannot be detected at a significantly greater distance. For example, at 4 times the expected distance, such as 12 feet, the signal is $1/4^6$ ($1/4096$) times as strong. This can place the signal power below the noise floor. Thus, data transmitted using NFMI has a low probability of detection at a distance significantly outside of the proximity boundary. The SRC device can be designed to minimize detection of an NFMI signal outside of the proximity boundary.

Figure 3:
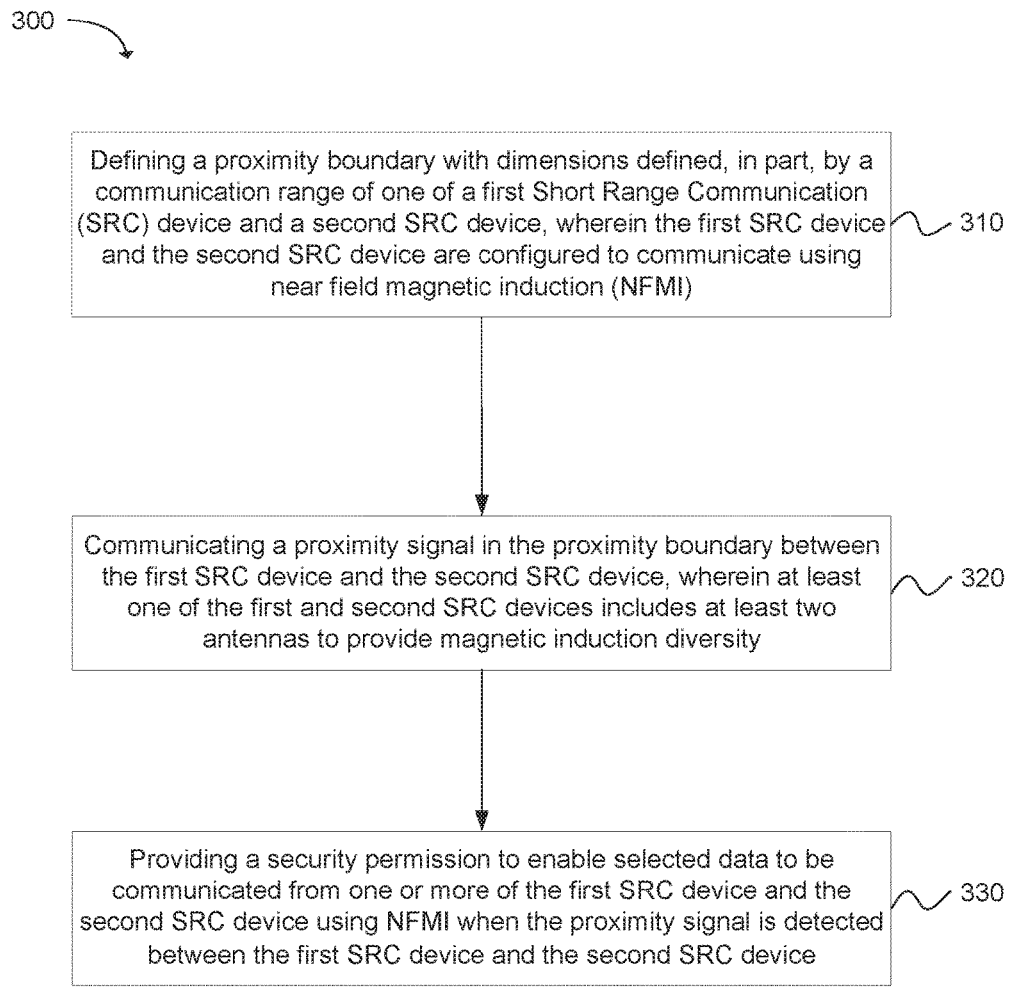
FIG. 3 illustrates a flow chart of a method for proximity based communications in accordance with an embodiment of the present invention.

FIG. 3 illustrates an exemplary method 300 for proximity based communications. The method can include the operation of defining a proximity boundary with dimensions defined, in part, by a communication range of one of a first Short Range Communication (SRC) device and a second SRC device, wherein the first SRC device and the second SRC device are configured to communicate using near field magnetic induction (NFMI), as in block 310. The method can include the operation of communicating a proximity signal in the proximity boundary between the first SRC device and the second SRC device, wherein at least one of the first and second SRC devices includes at least two antennas to provide magnetic induction diversity, as in block 320. The method can include the operation of providing a security permission to enable selected data to be communicated from one or more of the first SRC device and the second SRC device using NFMI when the proximity signal is detected between the first SRC device and the second SRC device, as in block 330.

In one example, the proximity signal includes information to indicate the security permission for one or more of the first SRC device and the second SRC device to communicate the selected data. In one example, the security permission is provided for one or more of the first SRC device and the second SRC device to communicate the selected data: while at least one of the first SRC device and the second SRC device are within the proximity boundary; or after receiving the proximity signal irrespective of location of the first SRC device or the second SRC device.

In one example, the method can include the operation of providing the security permission in an encrypted format. In one example, the security permission further enables the selected data to be communicated: from one or more of the first SRC device or the second SRC device to another computing device; from the first SRC device to the second SRC device; or from the second SRC device to the first SRC device. In one example, the method can include the operation of providing the security permission in an unencrypted format when the proximity signal is communicated substantially only in the proximity boundary.

In one example, the method can include the operation of defining a size of the proximity boundary based on at least one of: a transmit power of the first SRC device or the second SRC device, a receive sensitivity of the first SRC device or the second SRC device, or an antenna alignment of the first SRC device or the second SRC device. In one example, the method can include the operation of communicating the proximity signal in the proximity boundary as an NFMI signal using a first NFMI transceiver associated with the first SRC device and a second NFMI transceiver associated with the second SRC device.

In one example, the method can include the operation of providing the security permission to enable selected data to be transmitted or received from one or more of the first SRC device and the second SRC device. In one example, the method can include the operation of communicating the selected data using a first NFMI transceiver associated with the first SRC device and a second NFMI transceiver associated with the second SRC device, wherein the selected data is communicated using the first and second NFMI transceivers to maintain spatial security of the selected data within the proximity boundary. In one example, the first SRC device and the second SRC device are coupled to mobile computing devices.

Figure 4:
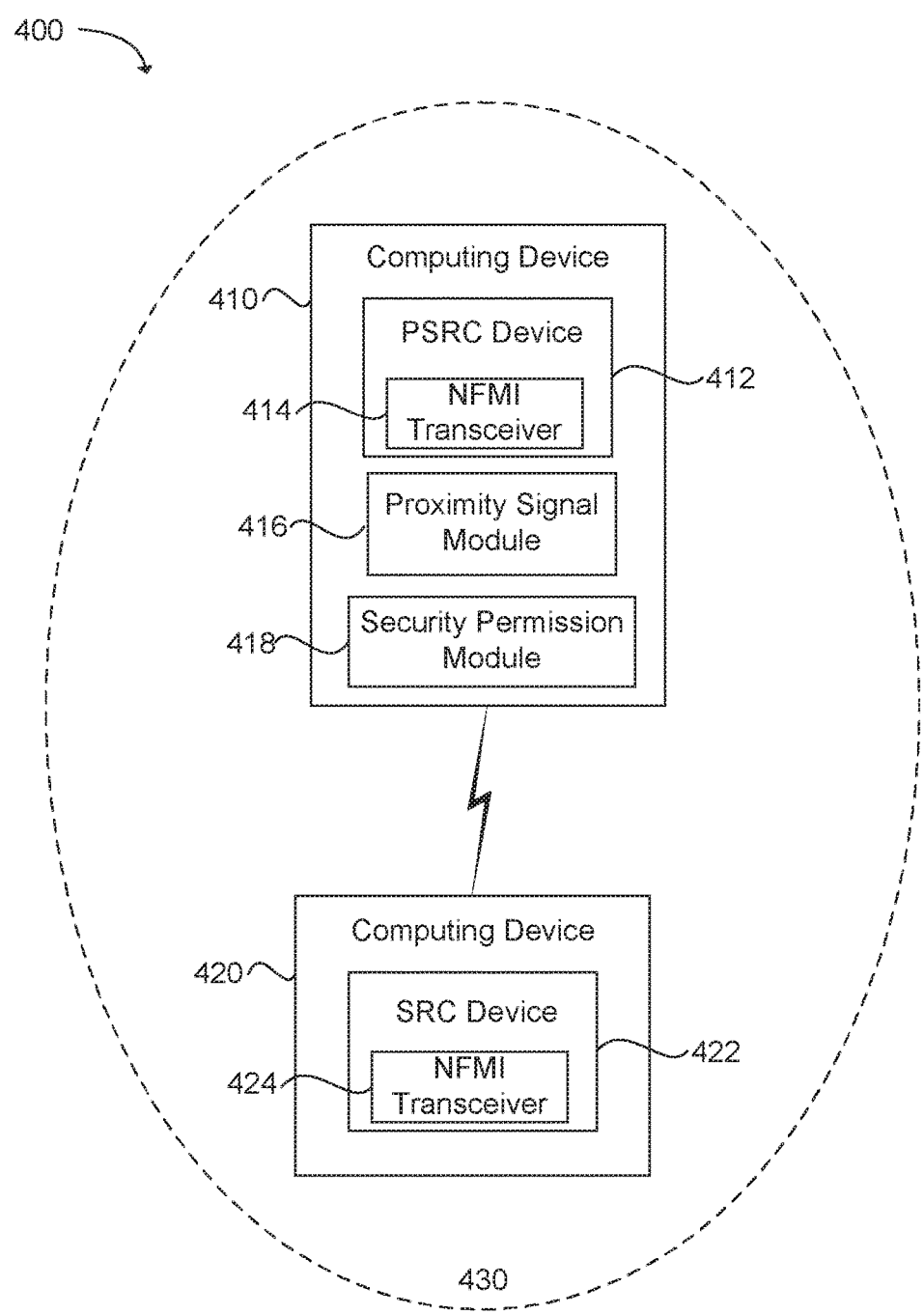
FIG. 4 illustrates a proximity based communications system in accordance with an embodiment of the present invention.

FIG. 4 illustrates an exemplary proximity based communications system 400. The proximity based communications system 400 can include a proximity Short Range Communication (PSRC) device 412 including a first near field magnetic induction (NFMI) transceiver 414. The PSRC device 412 can be in a substantially fixed position and coupled to a first computing device 410. The proximity based communications system 400 can include a SRC device 422 including a second NFMI transceiver 424. The SRC device 422 can be coupled to a second computing device 420. At least one of the PSRC device 412 and the SRC device 422 includes at least two antennas to provide magnetic induction diversity, wherein a proximity boundary 430 with dimensions is defined, in part, by a communication range of one or more of the PSRC device 412 or the SRC device 422. A proximity signal module 416, coupled to the PSRC device 412, can be configured to communicate a proximity signal to the SRC device 422 within the proximity boundary 430 to indicate that the PSRC device 412 and the SRC device 422 are located within the proximity boundary 430. A security permission module 418, coupled to the PSRC device 412, can be operable to provide a security permission to the SRC device 422 using NFMI when the proximity signal is detected between the PSRC device 412 and the SRC device 422. The security permission can enable the SRC device 422 to communicate selected data from within the proximity boundary 430.

In one example, at least one of the PSRC device 412 or the SRC device 422 is configured to communicate the selected data that comprises pairing information to allow at least one of the first computing device 410 or the second computing device 420 to pair with another computing device. In one example, the pairing information enables the first computing device 410 or the second computing device 420 to pair with another computing device via one of: NFMI, Bluetooth or a radio frequency (RF) communication standard.

In one example, the proximity signal module 416 can be configured to broadcast the proximity signal for detection at the SRC device 422. In one example, the security permission module 418 is configured to: provide the security permission in an encrypted format; or provide the security permission in an unencrypted format since the proximity signal is communicated substantially only in the proximity boundary 430. In one example, the security permission further enables: the PSRC device 412 to communicate the selected data to the SRC device 422 within the proximity boundary 430; or the SRC device 422 to communicate the selected data to another computing device from within the proximity boundary 430.

Figure 5:
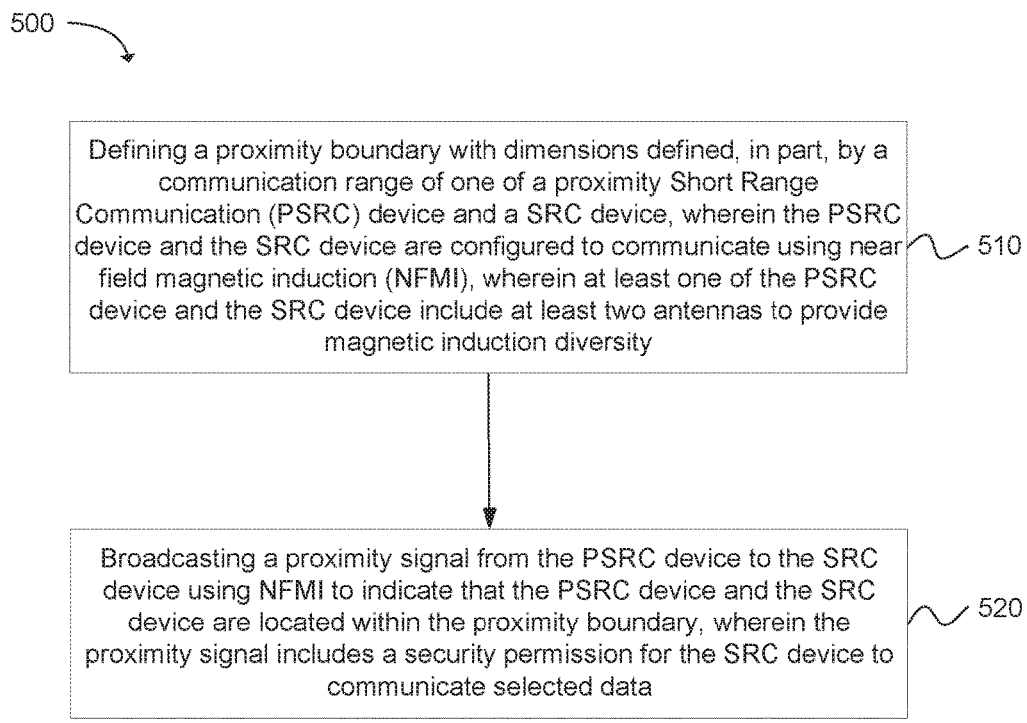
FIG. 5 illustrates a flow chart of a method for proximity based communications in accordance with an embodiment of the present invention.

FIG. 5 illustrates an exemplary method 500 for proximity based communications. The method can include the operation of defining a proximity boundary with dimensions defined, in part, by a communication range of one of a proximity Short Range Communication (PSRC) device and a SRC device, wherein the PSRC device and the SRC device are configured to communicate using near field magnetic induction (NFMI), wherein at least one of the PSRC device and the SRC device include at least two antennas to provide magnetic induction diversity, as in block 510. The method can include the operation of broadcasting a proximity signal from the PSRC device to the SRC device using NFMI to indicate that the PSRC device and the SRC device are located within the proximity boundary, wherein the proximity signal includes a security permission for the SRC device to communicate selected data, as in block 520.

In one example, the method can include the operation of defining a size of the proximity boundary based on at least one of: a transmit power of the PSRC device or the SRC device, a receive sensitivity of the PSRC device or the SRC device, or an antenna alignment of the PSRC device or the SRC device. In one example, the method can include the operation of terminating a communication of the selected data when the SRC device exits the proximity boundary. In one example, the method can include the operation of broadcasting the proximity signal in the proximity boundary as an NFMI signal using a first NFMI transceiver associated with the PSRC device, wherein the proximity signal is detected using a second NFMI transceiver associated with the SRC device.

In one example, the security permission is provided for the SRC device to communicate the selected data for at least one of: a selected time period; at a selected time period; while at least one of the PSRC device and the SRC device are within the proximity boundary; or after receiving the proximity signal irrespective of location of the PSRC device or the SRC device. In one example, the PSRC device is coupled to a computing device in a substantially fixed position and the SRC device is coupled to a mobile computing device.

It should be understood that many of the functional units described in this specification have been labeled as modules, in order to more particularly emphasize their implementation independence. For example, a module may be implemented as a hardware circuit comprising custom Very-Large-Scale Integration (VLSI) circuits or gate arrays, a custom Application-Specific Integrated Circuit (ASIC), off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a first Short-Range Communication (SRC) device, the apparatus configured to:
define a proximity boundary with dimensions defined, in part, by a selected communication range of the first SRC device, wherein the first SRC device is configured to communicate using near field magnetic induction (NFMI) with a second SRC device;
communicate a proximity signal in the proximity boundary between the first SRC device and the second SRC device, wherein the first SRC device includes at least two antennas to provide magnetic induction diversity, and using the magnetic induction diversity to substantially reduce a variability of the dimensions of the proximity boundary; and
provide a security permission to enable selected data to be communicated from one or more of the first SRC device and the second SRC device using NFMI when the proximity signal is detected between the first SRC device and the second SRC device.

2. The apparatus of claim 1, wherein the proximity signal includes information to indicate the security permission for one or more of the first SRC device and the second SRC device to communicate the selected data.

3. The apparatus of claim 1, wherein the security permission is provided for one or more of the first SRC device and the second SRC device to communicate the selected data:
while at least one of the first SRC device and the second SRC device are within the proximity boundary; or
after receiving the proximity signal irrespective of location of the first SRC device or the second SRC device.

4. The apparatus of claim 1, wherein the apparatus is further configured to:
provide the security permission in an encrypted format.

5. The apparatus of claim 1, wherein the security permission further enables the selected data to be communicated:
from one or more of the first SRC device or the second SRC device to another computing device;
from the first SRC device to the second SRC device; or
from the second SRC device to the first SRC device.

6. The apparatus of claim 1, wherein the apparatus is further configured to:
provide the security permission in an unencrypted format when the proximity signal is communicated substantially only in the proximity boundary.

7. The apparatus of claim 1, wherein the apparatus is further configured to:
define a size of the proximity boundary based on at least one of: a transmit power of the first SRC device or the second SRC device, a receive sensitivity of the first SRC device or the second SRC device, or an antenna alignment of the first SRC device or the second SRC device.

8. The apparatus of claim 1, wherein the apparatus is further configured to:
communicate the proximity signal in the proximity boundary as an NFMI signal using a first NFMI transceiver associated with the first SRC device and a second NFMI transceiver associated with the second SRC device.

9. The apparatus of claim 1, wherein the apparatus is further configured to:
provide the security permission to enable selected data to be transmitted or received from one or more of the first SRC device and the second SRC device.

10. The apparatus of claim 1, wherein the apparatus is further configured to:
communicate the selected data using a first NFMI transceiver associated with the first SRC device and a second NFMI transceiver associated with the second SRC device, wherein the selected data is communicated using the first and second NFMI transceivers to maintain spatial security of the selected data within the proximity boundary.

11. The apparatus of claim 1, wherein the first SRC device and the second SRC device are coupled to mobile computing devices.

12. An apparatus of a proximity Short-Range Communication (PSRC) device, the apparatus configured to:
define a proximity boundary with dimensions defined, in part, by a selected communication range of the PSRC device, wherein the PSRC device is configured to communicate using near field magnetic induction (NFMI) with a Short-Range Communication (SRC) device;
communicate a proximity signal in the proximity boundary between the PSRC device and the SRC device, wherein the PSRC device includes at least two antennas to provide magnetic induction diversity, and using the magnetic induction diversity to substantially reduce a variability of the dimensions of the proximity boundary;
communicate the proximity signal to the SRC device within the proximity boundary to indicate that the PSRC device and the SRC device are located within the proximity boundary; and
provide a security permission to the SRC device using NFMI when the proximity signal is detected between the PSRC device and the SRC device, the security permission enabling the SRC device to communicate selected data from within the proximity boundary.

13. The apparatus of claim 12, wherein at least one of the PSRC device or the SRC device is configured to communicate the selected data that comprises pairing information to allow at least one of PSRC device or the SRC device to pair with another computing device.

14. The apparatus of claim 13, wherein the pairing information enables the PSRC device or the SRC device to pair with another computing device via one of: NFMI, Bluetooth or a radio frequency (RF) communication standard.

15. The apparatus of claim 12, wherein the apparatus is further configured to:
broadcast the proximity signal for detection at the SRC device.

16. The apparatus of claim 12, wherein the apparatus is further configured to:
provide the security permission in an encrypted format; or
provide the security permission in an unencrypted format since the proximity signal is communicated substantially only in the proximity boundary.

17. The apparatus of claim 12, wherein the security permission further enables:
the PSRC device to communicate the selected data to the SRC device within the proximity boundary; or
the SRC device to communicate the selected data to another computing device from within the proximity boundary.

18. At least one non-transitory machine readable storage medium having instructions embodied thereon for performing proximity based communications, the instructions when executed by a mobile computing device perform the following:
defining a proximity boundary with dimensions defined, in part, by a selected communication range of the first SRC device, wherein the first SRC device is configured to communicate using near field magnetic induction (NFMI) with a second SRC device;
communicating a proximity signal in the proximity boundary between the first SRC device and the second SRC device, wherein the first SRC device includes at least two antennas to provide magnetic induction diversity, and using the magnetic induction diversity to substantially reduce a variability of the dimensions of the proximity boundary; and
providing a security permission to enable selected data to be communicated from one or more of the first SRC device and the second SRC device using NFMI when the proximity signal is detected between the first SRC device and the second SRC device.

19. The at least one non-transitory machine readable storage medium of claim 18, further comprising instructions that when executed perform:
providing the security permission in an encrypted format.

20. The at least one non-transitory machine readable storage medium of claim 18, further comprising instructions that when executed perform:
providing the security permission in an unencrypted format when the proximity signal is communicated substantially only in the proximity boundary.

21. The at least one non-transitory machine readable storage medium of claim 18, further comprising instructions that when executed perform:
defining a size of the proximity boundary based on at least one of: a transmit power of the first SRC device or the second SRC device, a receive sensitivity of the first SRC device or the second SRC device, or an antenna alignment of the first SRC device or the second SRC device.

22. The at least one non-transitory machine readable storage medium of claim 18, further comprising instructions that when executed perform:
communicating the proximity signal in the proximity boundary as an NFMI signal using a first NFMI transceiver associated with the first SRC device and a second NFMI transceiver associated with the second SRC device.

23. The at least one non-transitory machine readable storage medium of claim 18, further comprising instructions that when executed perform:
providing the security permission to enable selected data to be transmitted or received from one or more of the first SRC device and the second SRC device.

24. The at least one non-transitory machine readable storage medium of claim 18, further comprising instructions that when executed perform:
communicating the selected data using a first NFMI transceiver associated with the first SRC device and a second NFMI transceiver associated with the second SRC device, wherein the selected data is communicated using the first and second NFMI transceivers to maintain spatial security of the selected data within the proximity boundary.

* * * * *